United States Patent
Yamada et al.

(10) Patent No.: US 10,877,743 B2
(45) Date of Patent: Dec. 29, 2020

(54) CONTROL APPARATUS FOR UPDATING STORED PROGRAM AND METHOD FOR UPDATING PROGRAM STORED IN CONTROL APPARATUS

(71) Applicant: Mitsubishi Electric Corporation, Tokyo (JP)

(72) Inventors: Takamitsu Yamada, Tokyo (JP); Tomoaki Gyoda, Tokyo (JP); Keisuke Uemura, Tokyo (JP); Yunqing Fan, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/328,870

(22) PCT Filed: Nov. 29, 2016

(86) PCT No.: PCT/JP2016/085392
§ 371 (c)(1),
(2) Date: Feb. 27, 2019

(87) PCT Pub. No.: WO2018/100633
PCT Pub. Date: Jun. 7, 2018

(65) Prior Publication Data
US 2019/0384590 A1 Dec. 19, 2019

(51) Int. Cl.
*G06F 9/44* (2018.01)
*G06F 8/654* (2018.01)
(Continued)

(52) U.S. Cl.
CPC .............. *G06F 8/654* (2018.02); *G06F 9/445* (2013.01); *G06F 21/57* (2013.01)

(58) Field of Classification Search
CPC ........... G06F 8/654; G06F 9/445; G06F 21/57
(Continued)

(56) References Cited

U.S. PATENT DOCUMENTS 5,193,180 A * 3/1993 Hastings ................. G06F 8/447
714/E11.211
5,247,678 A * 9/1993 Littleton ............. G06F 9/44521
719/331
(Continued)

FOREIGN PATENT DOCUMENTS

JP H09-069043 A 3/1997
JP 2001-273143 A 10/2001
(Continued)

OTHER PUBLICATIONS

Cook et al, "A Symbol Table Abstraction to Implement Languages with Explicit Scope Control", IEEE, pp. 8-12 (Year: 1983).*
(Continued)

*Primary Examiner* — Anil Khatri
(74) *Attorney, Agent, or Firm* — Posz Law Group, PLC

(57) ABSTRACT

A control apparatus includes a RAM, a non-volatile storage device, and a computing device. The RAM stores an object file including an unresolved symbol. The non-volatile storage device stores a control program that can be updated. The computing device controls reception of the object file, generates a symbol-resolved object file by resolving the unresolved symbol, and updates the control program by using the symbol-resolved object file. The non-volatile storage device stores a symbol table in which only a function and a global variable that are accessed by the computing device executing a program described in the object file and that are allowed to be referred to during a process of updating the control program are defined. The computing device resolves the unresolved symbol by using the symbol table.

8 Claims, 5 Drawing Sheets

(51) Int. Cl.
*G06F 9/445* (2018.01)
*G06F 21/57* (2013.01)

(58) Field of Classification Search
USPC .................................................. 717/168–178
See application file for complete search history.

(56) References Cited

U.S. PATENT DOCUMENTS

| | | | | | |
|---|---|---|---|---|---|
| 5,408,665 | A | * | 4/1995 | Fitzgerald | G06F 8/433 707/999.01 |
| 5,764,989 | A | * | 6/1998 | Gustafsson | G06F 8/48 714/E11.21 |
| 5,778,231 | A | * | 7/1998 | van Hoff | G06F 8/54 717/143 |
| 5,848,274 | A | * | 12/1998 | Hamby | G06F 8/48 717/153 |
| 6,164,542 | A | * | 12/2000 | Ackley | G06K 7/14 235/454 |
| 6,189,145 | B1 | * | 2/2001 | Bellin, Jr. | G06F 9/44521 717/170 |
| 6,578,194 | B1 | * | 6/2003 | Baumgart | G06F 8/44 712/221 |
| 6,594,783 | B1 | * | 7/2003 | Dollin | G06F 8/427 714/38.14 |
| 6,708,330 | B1 | * | 3/2004 | Moberg | G06F 9/44521 711/118 |
| 6,766,511 | B1 | * | 7/2004 | Berry | G06F 11/3476 714/45 |
| 6,988,263 | B1 | * | 1/2006 | Hussain | G06F 11/323 714/E11.181 |
| 7,316,010 | B1 | * | 1/2008 | Daynes | G06F 9/445 717/140 |
| 7,406,687 | B1 | * | 7/2008 | Daynes | G06F 9/44521 717/118 |
| 7,526,760 | B1 | * | 4/2009 | Daynes | G06F 9/449 717/153 |
| 8,141,073 | B2 | * | 3/2012 | Bhandari | G06F 8/74 717/174 |
| 8,347,273 | B2 | * | 1/2013 | Nageshappa | G06F 11/3636 717/133 |

FOREIGN PATENT DOCUMENTS

| | | |
|---|---|---|
| JP | 2003-303111 A | 10/2003 |
| JP | 2005-258602 A | 9/2005 |

OTHER PUBLICATIONS

Yamagiwa et al, "A Reconfigurable Stream Compression Hardware based on Static Symbol Lookup Table", IEEE, pp. 86-93 (Year: 2013).*

Foster et al, "Object-Level Recombination of Commodity Applications", ACM, pp. 957-963 (Year: 2010).*

Urquiza-Fuentes et al, "Visualizing the Symbol Table", ACM, pp. 341 (Year: 2006).*

Holldobler et al, "Adaptable Symbol Table Management by Meta Modeling and Generation of Symbol Table Infrastructures", ACM, pp. 23-30 (Year: 2015).*

Reiss, "Generation of Compiler Symbol Processing Mechanisms from Specifications", ACM, pp. 127-163 (Year: 1983).*

Nazari et al, "Management of Guided and Unguided Code Generator Customizations by Using a Symbol Table", ACM, pp. 37-42 Year: 2015).*

International Search Report dated Feb. 21, 2017 issued in corresponding international patent application No. PCT/JP2016/085392 (English translation attached).

\* cited by examiner

FIG.4

| SYMBOL NAME | ADDRESS IN MEMORY MAP | ATTRIBUTE |
|---|---|---|
| extfunc1() | 0x1123 | FUNCTION void |
| extfunc2() | 0x1200 | FUNCTION void |
| extval1 | 0xBB4323AA | VARIABLE Integer |
| extval2 | 0xBB4323CD | VARIABLE char |

CONTROL APPARATUS FOR UPDATING STORED PROGRAM AND METHOD FOR UPDATING PROGRAM STORED IN CONTROL APPARATUS

CROSS REFERENCE TO RELATED APPLICATION

This application is a U.S. national stage application of International Patent Application No. PCT/JP2016/085392 filed on Nov. 29, 2016, the disclosure of which is incorporated herein by reference.

TECHNICAL FIELD

The present invention relates to a control apparatus and a program updating method for updating a stored program.

BACKGROUND

Some conventional electronic devices are equipped with an embedded microcomputer as a control apparatus. In the embedded microcomputer, a central processing unit (CPU) executes a program stored in a flash read only memory (ROM) to perform various control functions. The program stored in the flash ROM can be updated. Patent Literature 1 discloses a technique of copying a flash ROM rewriting program to a random access memory (RAM) in an embedded microcomputer, executing an update processing program in the RAM, and thus rewriting a program.

PATENT LITERATURE

Patent Literature 1: Japanese Patent Application Laid-open No. H9-69043

However, with the above conventional technique, the embedded microcomputer needs to erase the entire program (equivalent to the system program described in Patent Literature 1) once except for the rewriting program responsible for updating to a new program and a copying program responsible for copying the rewriting program to the RAM in order to entirely rewrite a program. Since rewriting to the flash ROM requires tasks of temporarily erasing the entire program and writing the new program, there is a problem in that a processing load is applied during the updating of the program in the embedded microcomputer that places a large restriction on processing speed.

SUMMARY

The present invention has been made in view of the above problem, and it is an object of the present invention to provide a control apparatus capable of reducing a processing load by updating only the part of a program for which there have been many processing change requests.

To solve the problem and achieve the object described above, a control apparatus according to an aspect of the present invention includes a first storage unit, a second storage unit, and a computing device. The first storage unit stores an object file including an unresolved symbol. The second storage unit stores a control program that can be updated. The computing device controls reception of the object file, generates a symbol-resolved object file by resolving the unresolved symbol, and updates the control program by using the symbol-resolved object file. The second storage unit stores a symbol table in which only a function and a global variable that are accessed by the computing device executing a program described in the object file and that are allowed to be referred to during a process of updating the control program are defined. The computing device resolves the unresolved symbol by using the symbol table.

A control apparatus according to the present invention has an effect in that a processing load can be reduced by updating only the part of a program for which there have been many processing change requests.

BRIEF DESCRIPTION OF DRAWINGS

FIG. 4 is a diagram illustrating an example of the format of a symbol table stored in a non-volatile storage device in the control apparatus.

DETAILED DESCRIPTION

Hereinafter, a control apparatus and a program updating method according to embodiments of the present invention will be described in detail with reference to the drawings. It should be noted that the present invention is not limited by the embodiments.

Embodiment

Figure 1:
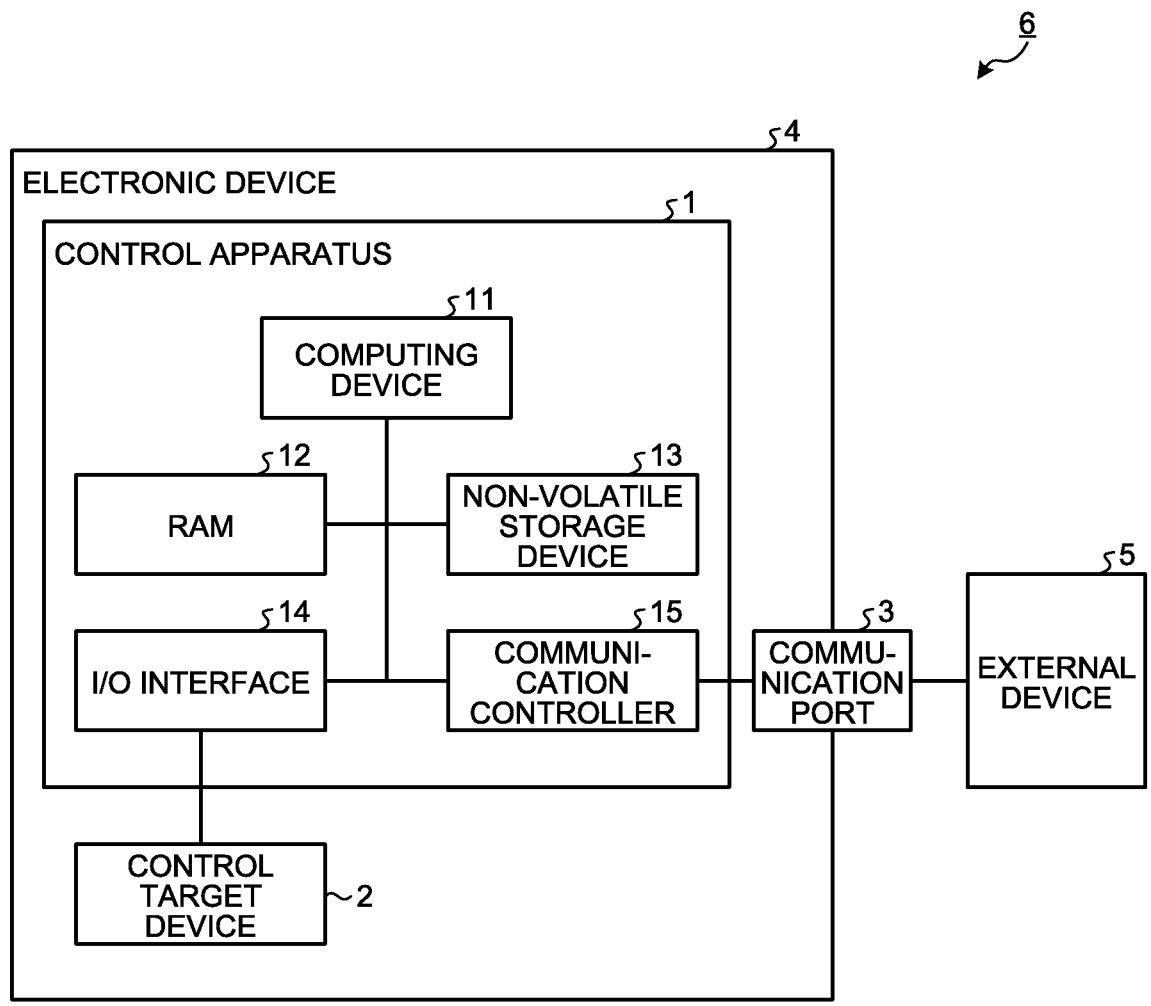
FIG. 1 is a diagram illustrating an example configuration of a control system.

FIG. 1 is a diagram illustrating an example configuration of a control system 6 according to an embodiment of the present invention. The control system 6 includes an electronic device 4 that operates in accordance with a description of a control program, and an external device 5 that transmits an object file, which is data for updating a part of the control program. The electronic device 4 includes a control target device 2, a control apparatus 1 that controls the control target device 2 in accordance with a description of the control program, and a communication port 3 that connects to the external device 5. The control apparatus 1 receives the object file from the external device 5 via the communication port 3.

The external device 5 is, for example, an information processing device such as a personal computer. The external device 5 generates an object file including an unresolved symbol and an execution code obtained by compiling the source code of software (hereinafter referred to as an application) of a control program to be updated, where the control program is stored in the control apparatus 1 of the electronic device 4. An unresolved symbol is a symbol that is declared but has no definition. The external device 5 transmits the generated object file to the electronic device 4. When the size of the object file is large, the external device 5 divides the object file into blocks of a prescribed size (functional units (e.g., subroutines and function units)) and transmits the divided object file to the electronic device 4.

The electronic device 4 is, for example, an air conditioner or some other household electric appliance. The control apparatus 1 included in the electronic device 4 is, for example, an embedded microcomputer. The control apparatus 1 stores a control program for controlling an operation of the control target device 2 in a non-volatile storage device 13. In the control apparatus 1, a computing device 11 refers to, i.e., reads and writes, a global variable loaded in a RAM 12 by executing a startup processing program 132 in accordance with a description of the control program stored in the non-volatile storage device 13, and it controls an operation of the control target device 2 via an I/O interface 14. Further, the computing device 11 controls a communication controller 15 such that the computing device 11 communicates with the external device 5. The computing device 11 is, for example, a CPU.

Figure 2:
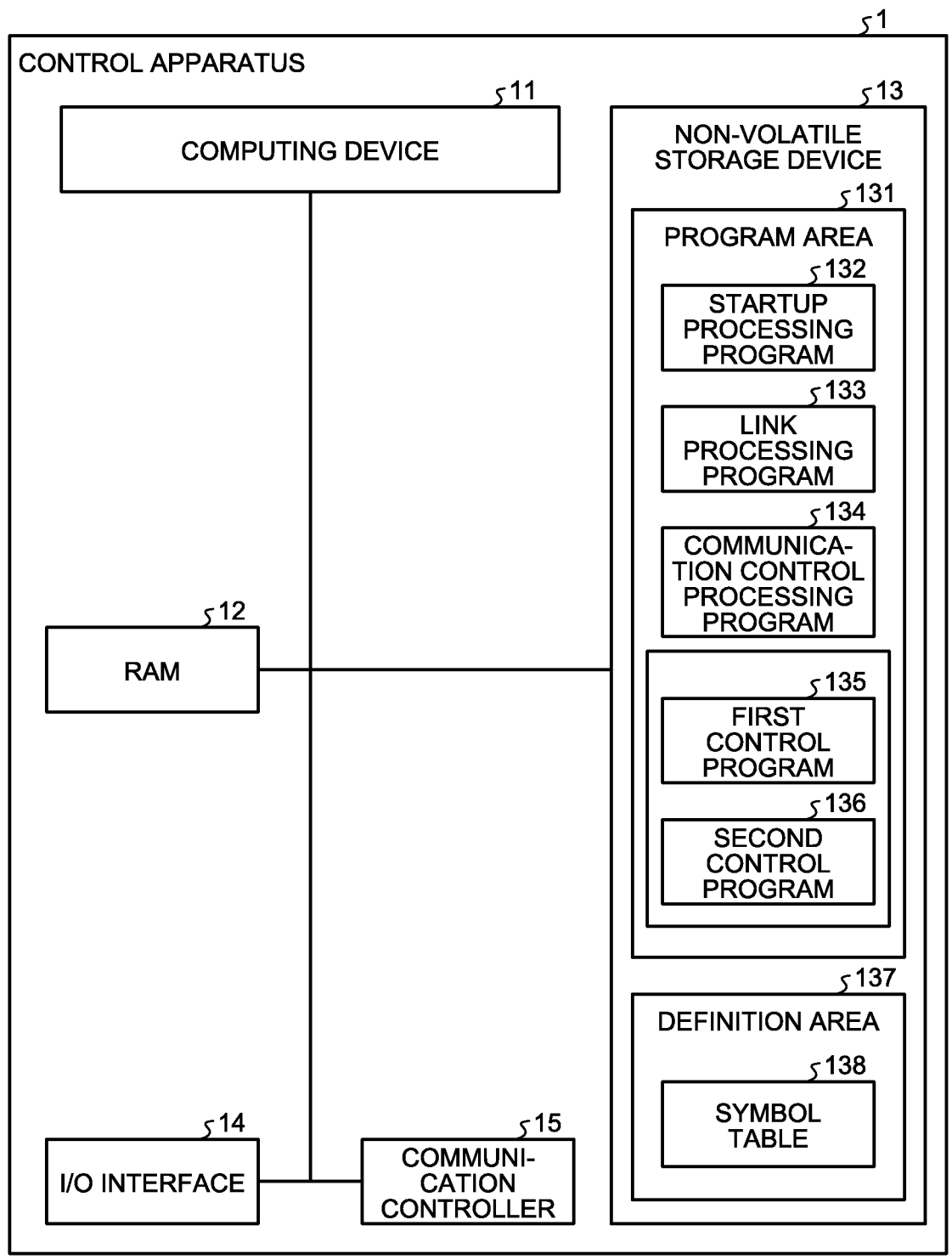
FIG. 2 is a block diagram illustrating an example configuration of the control apparatus.

FIG. 2 is a block diagram illustrating an example configuration of the control apparatus 1 according to the present embodiment. As described above, the control apparatus 1 includes the computing device 11, the RAM 12, the non-volatile storage device 13, the I/O interface 14, and the communication controller 15. The RAM 12 is a first storage unit, and the non-volatile storage device 13 is a second storage unit.

The computing device 11 has a function that executes programs stored in a program area 131 (the startup processing program 132, a link processing program 133, a communication control processing program 134, a first control program 135, and a second control program 136). The non-volatile storage device 13 includes the storage areas for the program area 131 and a definition area 137. In the storage area for the program area 131, the non-volatile storage device 13 stores the startup processing program 132, the link processing program 133, the communication control processing program 134, the first control program 135, and the second control program 136. Further, the non-volatile storage device 13 stores a symbol table 138 in the storage area for the definition area 137.

When the electronic device 4 is turned on, the computing device 11 operates and the computing device 11 executes the startup processing program 132 in the non-volatile storage device 13. In accordance with a description of the startup processing program 132, the computing device 11 initializes the hardware in the electronic device 4; performs a process of copying, to the RAM 12, a rewriting program responsible for updating a program to a new program and a link processing program having a program rewrite function; and performs a process of starting various software functions.

The computing device 11 executes the link processing program 133 copied into the RAM 12 by the startup processing program 132. The computing device 11 performs processing for updating the content of the second control program 136 in accordance with a description of the link processing program 133. Details of the update processing of the second control program 136 will be described later.

The computing device 11 executes the communication control processing program 134 by using the startup processing program 132. The computing device 11 transmits and receives data to and from the external device 5 in accordance with a description of the communication control processing program 134. The computing device 11 can receive, from the external device 5, an object file including an unresolved symbol and an execution code obtained by compiling a source code by the external device 5, and it can load the received object into the RAM 12.

The computing device 11 executes the first control program 135 and the second control program 136 in the non-volatile storage device 13. The computing device 11 controls the control target device 2 in accordance with a description of the first control program 135 and the second control program 136. The first control program 135 and the second control program 136 are collectively defined as a control program. In FIG. 2, an area that includes the first control program 135 and the second control program 136 is the control program.

The first control program 135 is the main body of the control program and is a program that cannot be rewritten, i.e., cannot be updated, in the present embodiment. The second control program 136 is a part of the entire control program and is a program that can be rewritten, i.e., can be updated by the external device 5 in the present embodiment.

The symbol table 138 is referred to when the computing device 11 resolves the unresolved symbol by executing the link processing program during a process of updating a part of the control program, i.e., an update processing of the second control program 136. The symbol table 138 is a table that defines functions and global variables that are accessed by a program described in the object file. In the symbol table 138, among functions in the first control program 135 and global variables that are in the RAM 12 and are referred to by the first control program 135, a correspondence list of a symbol that can be written and read by the second control program 136 and an address where an entity of each symbol exists in the memory map of the control apparatus 1 is defined. The symbol table 138 is for giving a definition to an unresolved symbol having no definition.

Here, a configuration of the memory map of the control apparatus 1 and the symbol table 138 will be described with reference to the drawings.

Figure 3:
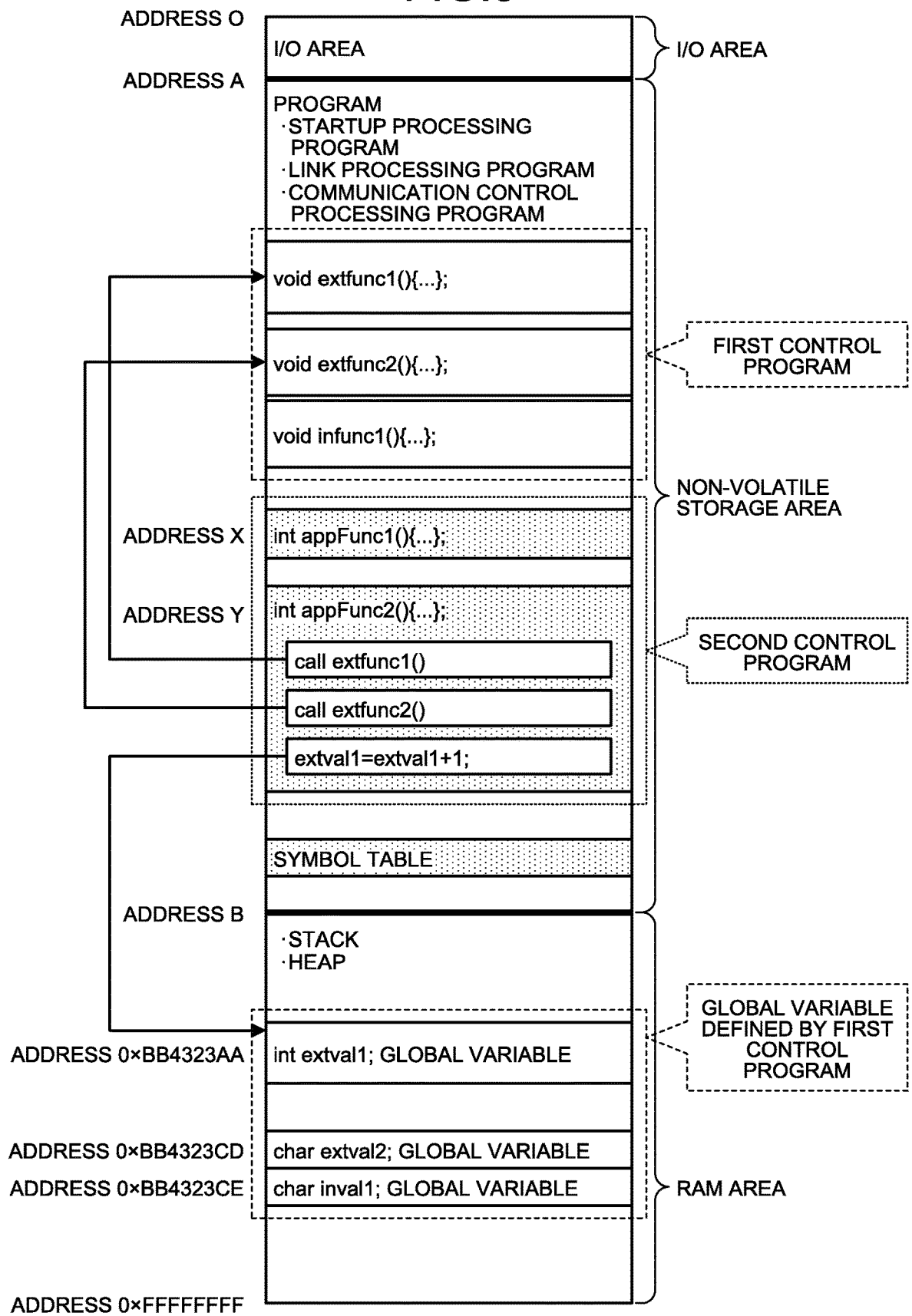
FIG. 3 is a diagram illustrating an example of a memory map defined in the control apparatus.

FIG. 3 is a diagram illustrating an example of the memory map defined in the control apparatus 1 according to the present embodiment. The memory map is obtained by assigning an address to the storage areas of all the storage units included in the control apparatus 1, and it is to show the storage areas for a program and the like that are visible from the computing device 11. Here, the storage areas of the I/O interface 14, the non-volatile storage device 13, and the RAM 12 of the control apparatus 1 are shown as the memory map. In the example of FIG. 3, the memory map is configured from three areas of an I/O area of the I/O interface 14 from an address 0 to an address A-1; a non-volatile storage area of the non-volatile storage device 13 from an address A to an address B-1; and a RAM area of the RAM 12 from an address B to an address 0xFFFFFFFF. These addresses are typically fixed for each embedded microcomputer, i.e., for each control apparatus 1. In the non-volatile storage area, an address is assigned to a program for each function stored in the non-volatile storage device 13 illustrated in FIG. 2.

In FIG. 3, a control program that cannot be updated is arranged in an area for the first control program 135. If the correspondence between a head address of a function defined in the area for the first control program 135, for example, extfunc1( ) and extfunc2( ) and a symbol name is defined in the symbol table 138, the computing device 11 can refer to the function defined in the area for the first control program 135 from a function of the second control program 136 by executing the link processing program 133. If a function defined in the area for the first control program 135, for example, infunc1( ) is not defined in the symbol table 138, it becomes possible to disable referencing the function defined in the area for the first control program 135 from the second control program 136 even when the computing device 11 executes the link processing program 133.

In FIG. 3, the second control program 136, which can be updated, is arranged in an area for the second control program 136 and assigned to a fixed address. In the example of FIG. 3, a first application is stored in an area with an address X as the head address, and a second application is stored in the area with an address Y as the head address. In this case, in the control apparatus 1, the computing device 11 can make a function call of a function of the second control program 136 from the first control program 135 without performing symbol resolution processing. During program update processing of the second control program 136, by executing the link processing program 133, the computing device 11 arranges an object file in block units in which the symbol has been resolved at a fixed address of the second control program 136 corresponding to the content of the object file in block units.

In FIG. 3, in the RAM area, global variables defined by the first control program 135 are stored in areas other than stack and heap areas. The RAM area is configured from a stack area, a heap area, and a global variable area. If the correspondence between an address of a global variable defined in an area for the global variable defined by the first control program 135, e.g., extval1 or extval2, and a symbol name is defined in the symbol table 138, the computing device 11 can refer to the global variable defined in an area for the global variable defined by the first control program 135 from a function of the second control program 136 by executing the link processing program 133. If the correspondence between an address of a global variable defined in the area for the global variable defined by the first control program 135, e.g., inval1, and a symbol name is not defined in the symbol table 138, it becomes possible to disable referencing the global variable defined in the area for the global variable defined by the first control program 135 from the second control program 136 even when the computing device 11 executes the link processing program 133.

It should be noted that, in the control apparatus 1, when the computing device 11 makes a function call of a function of the first control program 135 from the second control program 136, it becomes possible to access void extfunc 1( ) and void extfunc2( ) in the example of FIG. 3 during the process of symbol resolution of the program update processing described later.

FIG. 4 is a diagram illustrating an example of the format of the symbol table 138 stored in the non-volatile storage device 13 of the control apparatus 1 according to the present embodiment. In the symbol table 138, a symbol name described in the first control program 135 or the second control program 136, the corresponding address in the memory map in which addresses are assigned to storage areas of the control apparatus 1, and attribute information of each symbol are defined. The symbol table 138 describes only functions and global variables that are allowed to be referred to during the process of updating the second control program 136 by executing the link processing program 133 with the computing device 11.

Figure 5:
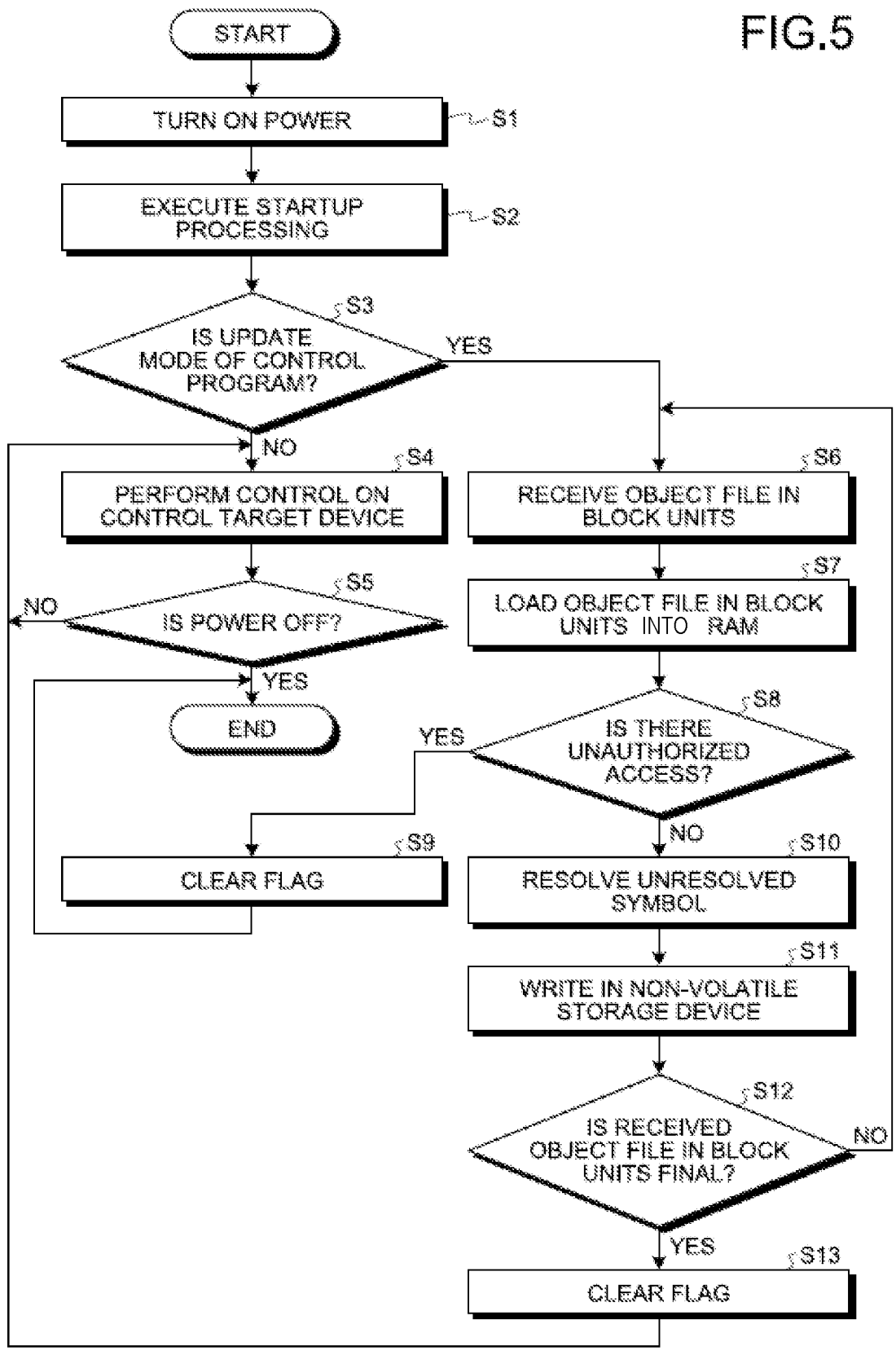
FIG. 5 is a flowchart illustrating a process of updating a part of the control program in the control apparatus.

Next, a process of updating a part of the control program, specifically the second control program 136, in the control apparatus 1 will be described. FIG. 5 is a flowchart illustrating a process of updating a part of the control program in the control apparatus 1 according to the present embodiment.

First, when the power of the electronic device 4 is applied, i.e., turned on, (step S1), the computing device 11 in the control apparatus 1 executes the startup processing program 132 to execute startup processing (including loading of global variables in the RAM 12) (step S2). Next, by executing the startup processing program 132, the computing device 11 reads a value of a specified global variable existing in the RAM 12, specifically, the state of a flag, and determines whether the control apparatus 1 is in an update mode for updating the control program (step S3).

It is assumed that whether the control apparatus 1 is in an update mode for updating the control program is set by a user in advance. Here, in order for the user to set the control apparatus 1 to an update mode for updating the control program, the setting is performed by any one of the following methods (1) and (2) during an operation of the control apparatus 1. It should be noted that the update operation is not executed unless the electronic device 4 is restarted even if the update flag is set to "1".

(1) The user sets the control apparatus 1 to the update mode for updating the control program by, for example, pressing a button attached to the electronic device 4. The electronic device 4 has a button that is one of the control target devices 2 illustrated in FIG. 1. When the user presses the button during a period from switching the power on of the electronic device 4 to completion of the startup processing, the computing device 11 of the control apparatus 1 detects a signal from the I/O interface 14, changes the value of the specified global variable existing in the RAM 12, and sets the flag indicating the update mode for updating the control program. For example, the computing device 11 sets a value indicating the state of the flag in the update mode to "1".

(2) The user sets the control apparatus 1 to the update mode for updating the control program in accordance with an instruction in a message from the external device 5. When the electronic device 4 receives the above-mentioned message from the external device 5 during a period from switching the power on to completion of the startup processing, the computing device 11 of the control apparatus 1 changes the value of the specified global variable existing in the RAM 12, and it sets the flag indicating the update mode for updating the control program.

When the computing device 11 determines, by executing the startup processing program 132, that the control apparatus 1 is not in an update mode for updating the control program (step S3: No), the computing device 11 performs control as usual on the control target device 2 in accordance with a description of the first control program 135 and the second control program 136 (step S4). In accordance with the description of the first control program 135 and the second control program 136, the computing device 11 performs control on the control target device 2 until the power of the electronic device 4 is turned off (step S5: No). When the power of the electronic device 4 is turned off (step S5: Yes), the processing is terminated.

When the computing device 11 determines, by executing the startup processing program 132, that the control apparatus 1 is in an update mode for updating the control program (step S3: Yes), the computing device 11 receives an object file in block units divided into blocks of a prescribed size (functional units (e.g., subroutines and function units)) from the external device 5 by executing the communication control processing program 134 in a case of the update mode for updating the control program (step S6). By executing the communication control processing program 134, the computing device 11 loads the received object file in block units in the RAM 12 (step S7). The RAM 12 stores the object file in block units. After loading, the execution of the communication control processing program 134 by the computing device 11 is terminated, and the computing device 11 executes the link processing program 133.

By executing the link processing program 133, the computing device 11 checks the received object file in block units on the RAM 12 and determines whether there is an unauthorized access (step S8). Specifically, when an unresolved symbol is included in the received object file in block units, the computing device 11 refers to the symbol table 138 in order to resolve the unresolved symbol. When the unresolved symbol includes a symbol that is not defined in the symbol table 138, the computing device 11 determines that there is an unauthorized access (step S8: Yes). The computing device 11 changes the value of the specified global variable (=flag), clears the flag indicating the update mode for updating the control program (step S9), and terminates the processing. Clearing the flag means that, for example, the computing device 11 sets a value indicating the state of the flag in the update mode to "0".

By executing the link processing program 133, when the unresolved symbol includes no symbol that is not defined in the symbol table 138, the computing device 11 determines that there is no unauthorized access (step S8: No). The computing device 11 refers to the symbol table 138, acquires address information, replaces the symbol name of the unresolved symbol with a real address, and resolves the unresolved symbol (step S10).

By executing the link processing program 133, the computing device 11 writes (arranges) the object file in block units that has been loaded in the RAM 12 and in which the symbol has been resolved in a specified address in the non-volatile storage device 13 in the area for the second control program 136 (step S11). The computing device 11 causes the non-volatile storage device 13 to store a new symbol-resolved object in the area for the second control program 136 corresponding to the content of the symbol-resolved object and updates the second control program 136. In this way, the computing device 11 updates the second control program 136 by using the generated symbol-resolved object.

If the received object file in block units is not final (step S12: No), the control apparatus 1 returns to step S6 and repeats the processing up to step S11. For example, in the external device 5, by giving information indicating the number of divisions and what number the block is to the object file in block units to be transmitted, the control apparatus 1 can determine whether the received object file in block units is final.

When the received object file in block units is final (step S12: Yes), the computing device 11 executes the link processing program 133 to change the value of the specified global variable (=flag) to clear the flag indicating the update mode for updating the control program (step S13). Then, the processing proceeds to step S4, and the computing device 11 performs control on the control target device 2 in accordance with the description of the first control program 135 and the second control program 136 (step S4). Meanwhile, in a case of Yes in step S12, in the control apparatus 1, the computing device 11 may perform the processing from step S3 after the processing of step S13.

Here, a hardware configuration of the control apparatus 1 will be described. As described above, the control apparatus 1 is implemented by an embedded microcomputer. In the control apparatus 1, each function is implemented by the computing device 11, which is a CPU, reading and executing a program stored in the non-volatile storage device 13, which is a memory. Here, the CPU may be a processing device, a microprocessor, a microcomputer, a processor, a digital signal processor (DSP), or the like. Further, the memory is, for example, a flash memory, but it is sufficient if the memory is a rewritable memory such as an erasable programmable ROM (EPROM) or an electrically EPROM (EEPROM).

As described above, according to the present embodiment, the control apparatus 1 receives an object including an execution code and an unresolved symbol from the external device 5, resolves the unresolved symbol, creates an object file in which the symbol has been resolved, and updates the second control program 136, which is a part of the control program and can be updated. As a result, the control apparatus 1 can update a given part of the control program, and it can thus reduce the processing load when compared with a case where the entire control program is updated in order to update a part of the control program. Further, when compared with a case where the entire control program is updated in order to update a part of the control program, the control apparatus 1 can, by updating only a part of the control program, shorten the update time.

The control apparatus 1 does not perform dynamic symbol resolution processing, which is generally used during a partial update, addition, or the like of a program. Therefore, the control apparatus 1 does not bear this processing load during device control and the performance of the device control is not degraded. The above-mentioned dynamic symbol resolution processing is, for example, a dynamic link library (DLL), a plug-in, or the like. Further, the control apparatus 1 does not require a file system for storing an application such as a DLL.

Further, the control apparatus 1 realizes a partial update or addition of the control program by using a static function. The control apparatus 1 restricts a linker function by fixing a position at which the control program to be updated is arranged in the non-volatile storage device 13 and also by using the symbol table 138 to reduce the number of symbols permitted to access the control program to be updated. Making the linker function compact enables installation of the linker function in the control apparatus 1.

By installing the linker function in the control apparatus 1, the control apparatus 1 can resolve the unresolved symbol by using the symbol table 138 stored in the control apparatus 1. The control apparatus 1 can hide the relationship between an address in the control apparatus 1 and individual functions such as a function name and a variable name, and it can prevent use of the second control program 136 for referring to an invalid address. As a result, the control apparatus 1 can prevent unauthorized use, and it can obtain an effect in terms of security.

When the external device 5 has a symbol table and resolves an unresolved symbol, it is necessary for the external device 5 to select a symbol table that is compatible with the version of the control program of the control apparatus 1. This is because there is a difference in the relationship between a symbol and an address depending on the version of the control program of the control apparatus 1. Therefore, in creating an object file for a partial update of the control program, it is necessary for the external device 5 to correctly manage the symbol table. If the external device 5 performs symbol resolution without using the symbol table corresponding to the control program to be updated in the control apparatus 1, this may lead to unauthorized access to the control program. By resolving an unresolved symbol in the control apparatus 1, such an unauthorized operation can also be prevented.

Further, the basic parts of the control program in the control apparatus 1, specifically, the startup processing program 132, the link processing program 133, the communication control processing program 134, and the first control program 135 cannot be updated, and only the second control program 136 can be updated. Thus, the control apparatus 1 can prevent a malfunction of the electronic device 4 due to a failure in rewriting the first control program 135.

Further, the external device 5 transmits an object file divided into blocks of a prescribed size to the control apparatus 1. Thus, even in a case where the capacity of the RAM 12 is low and the entire object file cannot be loaded, the control apparatus 1 can still partially update the second control program 136.

It should be noted that, when the size of the object file transmitted from the external device 5 is large, the external device 5 divides the object file into blocks of a prescribed size and transmits the divided object file to the electronic device 4, but the present invention is not limited thereto. The external device 5 may transmit an object file of a large size to the electronic device 4, and the computing device 11 may divide the received object file into blocks of a prescribed size by executing the communication control processing program 134.

The configurations illustrated in the above embodiment illustrate examples of an aspect of the present invention and can be combined with another known technique, and it is also possible to omit and change a part of the configuration without departing from the subject matter of the present invention.

The invention claimed is:

1. A control apparatus comprising:
a first storage unit storing an object file comprising an unresolved symbol;
a second storage unit storing a control program, the control program being capable of being updated; and
a computing device controlling reception of the object file, generating a symbol-resolved object file by resolving the unresolved symbol, and updating the control program by using the symbol-resolved object file, wherein
the second storage unit stores a symbol table in which only a function and a global variable that are accessed by the computing device executing a program described in the object file and that are allowed to be referred to during a process of updating the control program are defined,
the computing device generates a symbol-resolved object file in block units in which a symbol is resolved, and causes the second storage unit to store the symbol-resolved object file, and
the computing device uses the unresolved symbol table to both (a) determine an unauthorized operation and (b) resolve the unresolved symbol.

2. The control apparatus according to claim 1, wherein
an address indicating an area that stores the symbol-resolved object file in the second storage unit is a fixed address, and
the computing device causes the second storage unit to store the symbol-resolved object file in an area for the control program corresponding to content of the symbol-resolved object file, and updates the control program.

3. The control apparatus according to claim 1, wherein
the computing device receives an object file divided into blocks of a prescribed size, and resolves an unresolved symbol included in a block of the object file.

4. The control apparatus according to claim 3, wherein information, indicating the number of divisions and what number a block is, is given to each of the blocks of the object file received by the computing device.

5. The control apparatus according to claim 1, wherein
the first storage unit is a random access memory, and
the second storage unit is a non-volatile storage device.

6. The control apparatus according to claim 1, wherein
the computing device checks the object file received and, when the unresolved symbol includes a symbol that is not defined in the symbol table, the computing device determines that there is an unauthorized access and terminates the process of updating the control program.

7. A program updating method in a control apparatus controlling a control target device, the program updating method comprising:
a receiving step of a computing device receiving an object file comprising an unresolved symbol;
a resolving step of the computing device resolving the unresolved symbol and generating a symbol-resolved object file in which a symbol is resolved, in a first storage unit storing the object file; and
an updating step of the computing device causing a second storage unit storing a control program to store the symbol-resolved object file in an area for the control program corresponding to content of the symbol-resolved object file, and
updating the control program, the control program being capable of being updated, wherein
the second storage unit stores a symbol table in which only a function and a global variable that are accessed by the computing device executing a program described in the object file and that are allowed to be referred to during a process of updating the control program are defined,
the computing device generates a symbol-resolved object file in block units in which a symbol is resolved, and causes the second storage unit to store the symbol-resolved object file, and
the computing device uses the unresolved symbol table to both (a) determine an unauthorized operation and (b) resolve the unresolved symbol.

8. The program updating method according to claim 7, further comprising a step of the computing device checking the object file received, when the unresolved symbol includes a symbol that is not defined in the symbol table, determining that there is an unauthorized access, and terminating the process of updating the control program.

\* \* \* \* \*